Aug. 21, 1962

T. H. LJUNGGREN 3,050,247

SHAFT POSITIONER

Filed Dec. 31, 1958

INVENTOR
Thor H. Ljunggren

Sughrue, Rothwell, Mion and Zinn
ATTORNEYS

INVENTOR
Thor H. Ljunggren

Sughrue, Rothwell, Mion & Zinn
ATTORNEYS

Aug. 21, 1962     T. H. LJUNGGREN     3,050,247
SHAFT POSITIONER
Filed Dec. 31, 1958     3 Sheets-Sheet 3
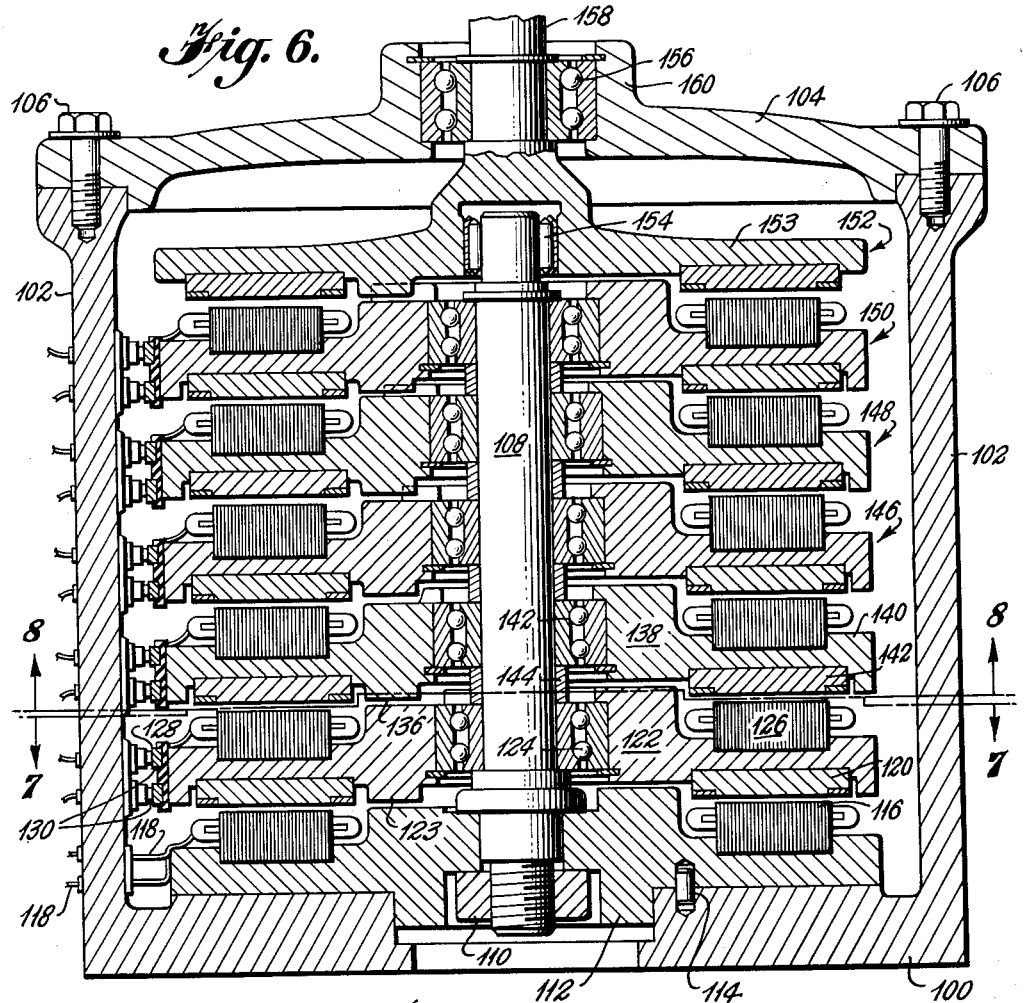
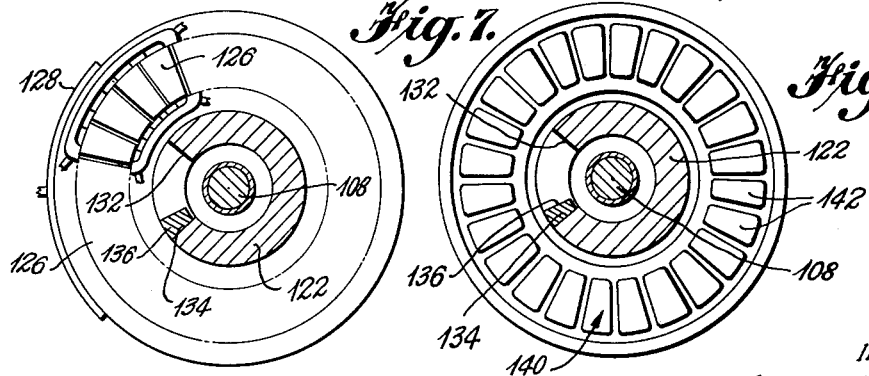
INVENTOR
Thor H. Ljunggren
Sughrue, Rothwell, Mion and Zinn
ATTORNEYS ns of the adjacent stage. Thus, each of
the stages when independently driven may be utilized to
selectively position the output shaft. The amount of
movement allowed to each of the driver supports is progressively increased from the output shaft to ground by a
factor of two such that when the driver elements are
selectively activated the angular position of the output
shaft will be an analogue of the binary signal selectively
applied to the driver elements. Two modifications are
disclosed, in one the driver elements include a plurality
of fluid power motors and in the other embodiment the
driver elements include a plurality of electric motors.

United States Patent Office 3,050,247
Patented Aug. 21, 1962

3,050,247
SHAFT POSITIONER
Thor H. Ljunggren, Perkinsville, Vt., assignor, by mesne
assignments, to Ex-Cell-O Corporation, Detroit, Mich.,
a corporation of Michigan
Filed Dec. 31, 1958, Ser. No. 784,302
4 Claims. (Cl. 235—61)

This invention relates to improvements in shaft positioners and more particularly relates to a positioning apparatus for selectively positioning a rotatable output shaft in accordance with any desired input signals.

In numerous fields of endeavor including automation and data processing, it is often desirable to provide a selective means for rotatably positioning a shaft in response to input signals. While the foregoing is generally desirable such an apparatus should be capable of providing the rotation of the output shaft at any desired power and without any lost motion whatsoever between a stationary base and the output. Accordingly, it is the object of this invention to provide a shaft positioner which will positively set the angular position of the output shaft in response to selected input power elements.

It is also an object of this invention to provide a shaft positioner having a plurality of input elements for selectively angularly positioning an output shaft wherein power may be selectively applied to the input elements in binary form to produce an angular rotation of the output shaft which is an analogue of the binary signal applied by the elements.

Other objects and advantages of this invention will be pointed out in the following detailed description and appended claims and illustrated in the accompanying drawings which disclose, by way of example, the principles of this invention and the best mode which has been contemplated of applying these principles, as well as a modification thereof.

In the drawings:

FIG. 5 is a schematic view of the separate cascaded elements showing one of the sixty-four possible angular positions in a six-stage shaft positioner;

FIG. 6 is a sectional elevation view of a modification utilizing the principles of this invention in which an electric motor supplies the power to the positioning elements;

FIG. 7 is a sectional view on a smaller scale taken along line 7—7 of FIG. 6;

FIG. 8 is a sectional view on a smaller scale taken along line 8—8 of FIG. 6.

Figure 1:
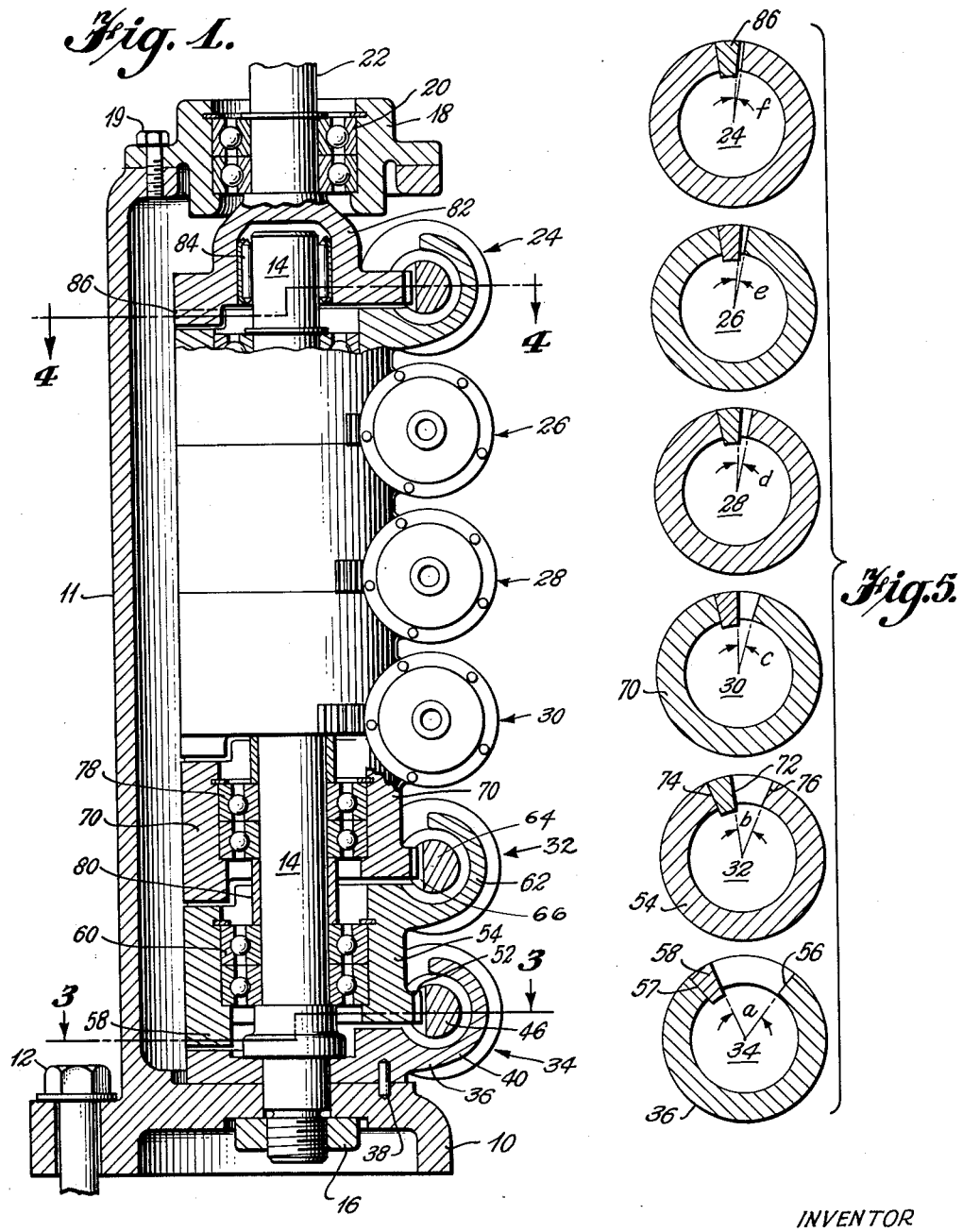
FIG. 1 is an elevation view, partially in section, of a fluid powered shaft positioner embodying the principles of this invention.
Figure 2:
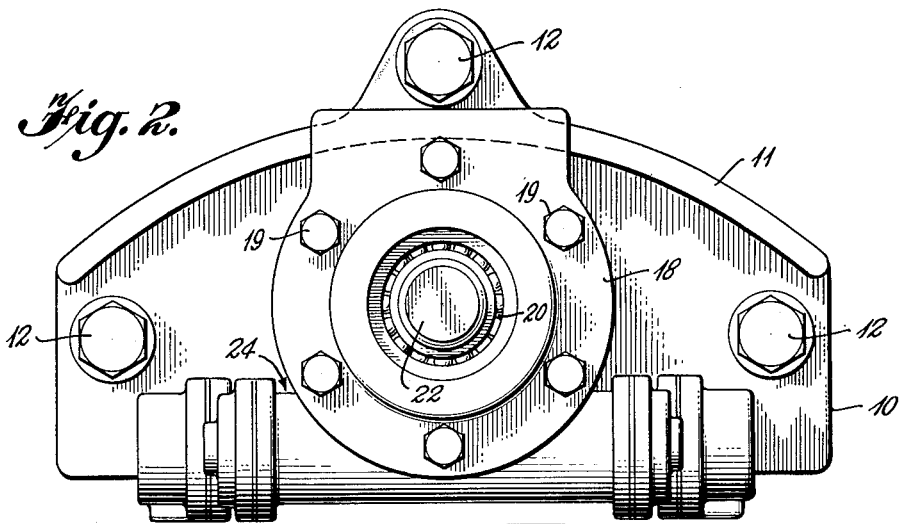
FIG. 2 is a top plan view of the shaft positioner shown in FIG. 1.

In general this invention includes a stationary base having a stationary support rod secured thereto. An output shaft which is adapted to be positioned is journaled in a portion of the stationary base. A plurality of driver stages are mounted for free rotation upon the supporting rod. Each of these driver stages includes a driver element having a driver element support, and a driven element. The driver element support of each succeeding stage is the driven element of the preceding stage. The initial stage has its driver element support rigidly attached to the base or ground reference and the last stage driven element directly drives the output shaft. The amount of movement of the driver element supports is limited by lugs cooperating with abutments on driver Referring to the drawings, FIG. 1 shows a base 10 which is rigidly attached to any suitable stationary support by a plurality of bolts 12, thus furnishing a ground reference. An upright support rod 14 is rigidly secured to the base 10 by means of a nut 16 threaded on the lower end of rod 14.

The base 10 includes an upright portion 11 for supporting a top bearing housing 18 which is secured thereto by suitable screws 19. The bearing housing 18 supports anti-friction bearings 20 for journaling an output shaft 22 which is the shaft to be angularly positioned.

Output shaft 22 is angularly positioned without any lost motion by means of selectively applying power to any one of a plurality of driving stages. These driving stages are indicated generally by reference numerals 24, 26, 28, 30, 32, and 34 from the top down as viewed in FIG. 1.

Figure 3:
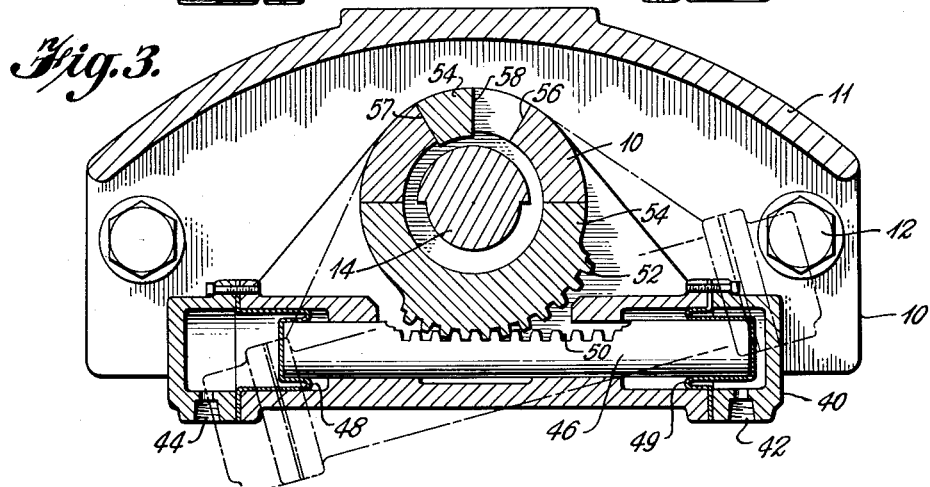
FIG. 3 is a sectional view taken along line 3—3 of FIG. 1.

Referring specifically to driver stage 34, this stage includes a stator member 36 which is secured to the base by a suitable means (not shown) and a locating pin 38, for fixing the angular position of member 36. Referring to FIG. 3, the stator 36 includes a cylinder 40 having fluid inlets 42 and 44 at opposite ends thereof. A piston 46 is slidably mounted within cylinder 40 and is sealed at its opposite ends by suitable flexible sealing members such as "Bellowframes" 48 and 49. The piston 46 includes a rack 50 formed integrally therein. The piston 46 and rack 50 therefore constitute the driving means for the first stage of the device. The teeth of the rack 50 are in mesh with the teeth of a gear segment 52 on a member 54. Member 54, as shown in FIG. 1, is not only the driven member of the first stage 34 but is also the support for the driving elements of the adjacent stage 32. Member 54 is free to rotate upon supporting shaft 14 and is journaled thereon by suitable anti-friction bearings 60.

Referring again to FIG. 3, the base 10 includes a cutout portion which is defined by end abutments 56 and 57. Member 54 includes an integral depending lug 58 which extends into the cutout portion of the base. Thus, lug 58 cooperating with abutments 56 and 57 defines and limits the oscillatory movement of member 54.

Driver stage 32 is similar in construction to driver stage 34. However, the supporting member 54 for driver stage 32 is also the driven member of driver stage 34. Therefore, before any power is applied to the driver of stage 32 it will be positioned by member 54 according to the application of power at stage 34.

Driver stage 32 includes a cylinder member 62 and a piston 64 having a rack 66 thereon similar to these elements of driver stage 34. Rack 66 drives a member 70 in a similar manner to that in which member 54 was driven. Member 70 includes a lug 72 depending therefrom and operable between spaced abutments 74 and 76 formed in member 54. As shown in FIG. 5, the amount of movement allowed member 70 as defined by the lug 72 and abutments 74 and 76 is one-half the amount of the movement allowed member 54.

Member 70 is likewise journaled on shaft 14 by suitable bearing 78 and is axially spaced on the shaft by spacer 80.

The construction of driver stages 30, 28 and 26 are identical to that of stage 32 with the exception of the amount of movement in which the driver support member is allowed to move. This is shown schematically in FIG. 5. Since the construction of these stages is similar to stage 32, these stages will not be described in detail herein.

The last driving stage 24 is also similarly constructed with a cylinder and piston arrangement but the piston rack drives a bell-shaped housing 82 which is integral with the output shaft 22. Housing 82 is journaled by bearings 84 on the top end of support rod 14. Housing 82 includes a lug 86 operable between spaced abutments on the preceding member as described previously. However, the amount of movement allowed by the abutments is one-half of that of the preceding stage as described above.

Although the devices could have as many stages as is desired, a six-stage device is illustrated. The arrangement for limiting the oscillation of the driver supports is schematically illustrated in FIG. 5 wherein, for simplicity, the abutment-defining members and lugs of the adjacent members are the only elements shown. The spacing of the abutments is progressively increased from the top to the bottom to afford a differential limitation of the oscillatory movement for each stage in the manner of a binary system. In other words, the amount of movement of stage 26 is twice the movement of stage 24 and the movement of stage 28 is twice the movement of stage 26, etc. This makes it possible to establish sixty-four different angular positions of the output shaft relative to any stationary reference. As viewed in FIG. 5, all of the lugs are shown against the left-hand abutments, thus establishing a position zero. Any of the lugs may be moved selectively to the position defined by the right-hand abutment to correspondingly angularly rotate the output shaft a selected amount.

Figure 4:
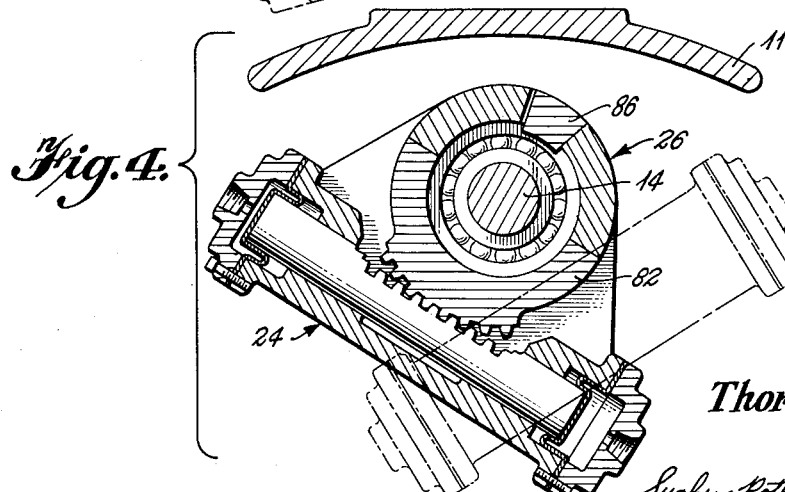
FIG. 4 is a sectional view taken along line 4—4 of FIG. 1.

The extreme positions of the driver stage 24 are shown in FIG. 4. In the phantom line position, the driving member is in the zero state while in the full line position the driving element is in the opposite state and all of the other elements are in the opposite state, thereby driving the output shaft 22 to the limit of the system.

Although the operation of the device is believed to be evident from the foregoing description, a brief summary thereof will now be described. With the device having lugs in the position as shown schematically in FIG. 5, the device is in the ground or zero state. By supplying fluid to fluid inlet 42, piston 46 is moved to the left causing rack 50 in mesh with segment 52 to move member 54 and therefore lug 58 carried thereby to the position defined by stationary abutment 56 on base 10. This in turn moves all of the other stages thereabove the distance defined by the abutments 56, 57 and lug 58, i.e., angular distance "a," FIG. 5. In a similar manner power may selectively be applied to either end of cylinder 62 to move the lug 72 carried thereby to its right-hand position against abutment 76 through the angle "b." If member 70 is moved till lug 72 contacts abutment 76, this in turn also moves all of the driver stages above stage 32 and the output shaft moves an angular distance equal to "b." The next succeeding stages 30, 28 and 26 may also be selectively activated to similarly move the output shaft 20 through additional angles "c," "d," "e." In a like manner, the last stage 24 corresponding to the least significant digit of a binary system may also be selectively moved. It may thus be seen that if the angles successively increase or decrease from one end of the device toward the other, the selective movement of the output shaft will be analogue of a binary signal applied to all of the driving stages. In other words, if stage 24 represented the decimal equivalent 1 of a binary input signal of the least significant digit of a six digit binary number, stage 26 the decimal equivalent 2 of binary 000010, stage 28 the decimal equivalent 4 of binary 000100, stage 30 the decimal equivalent 8 of binary 001000, stage 32 the decimal equivalent 16 of binary number 010000, and stage 34 the decimal equivalent 32 of the binary number 100000, then, by selectively powering any of the stages simultaneously any angular position of the output shaft will represent the analogue of the input signal.

A modification utilizing the principles of this invention may be constructed utilizing electric motor powered stages. Such a modification is illustrated in FIGS. 6, 7 and 8. Referring to FIG. 6, a stationary base 100 having upstanding sidewalls 102 supports a top cap 104 which is secured thereto by screw means 106. A stationary support rod 108 is attached to a stationary rod support 112 by a nut 110 threaded on its lower end. Rod support 112 is secured to base 100 by means not shown, and a pin 114, for fixing the angular position of the support 112. Stationary rod support 112 includes a stator 116 of an electric motor and also includes spaced abutments for limiting the movement of the next succeeding stage. Electric power is supplied to the stator 116 through electric conductor 118. A rotor 120 of the electric motor including stator 116 is secured to a second stage rotary member 122. Rotary member 122 is freely journaled on support rod 108 by antifriction bearings 124, and member 122 has a depending lug 123 which cooperates with abutments on rod support 112 to limit the movement thereof. In a similar manner, the second stage rotary member 122 supports a stator member 126 of the motor for the next successive stage. Electric power is supplied to stator 126 by means of slip rings 128 and brushes 130.

As shown in FIGS. 7–8, member 122 includes a pair of spaced abutments 132 and 134 for limiting the movement of the rotary member 138 of the next succeeding stage. Rotary member 138 includes a depending lug 136 which operates in a manner similar to that described for the fluid power device. Rotary member 138 also includes an electric motor rotor 140 for cooperation with stator 126 for powering this stage (FIG. 6). Member 138 is freely journaled on support rod 108 by bearings 142 and is spaced above member 122 by a suitable spacer 144. The next succeeding stages 146, 148 and 150 are similar to that previously described with the exceptions of the spacing between the abutments which is similar to that described in the schematic showing of FIG. 5.

The output stage 152 is likewise similar to the ouput stage previously described for the fluid powered embodiment and includes a shaft flange 153 journaled on the support rod 108 by bearing 154. This shaft flange 153 is integral with output shaft 158. Output shaft 158 is suitably journaled by anti-friction bearings 156 in a boss 160 in the housing top cap 104.

The operation of the electric power device is similar to that previously described for the fluid power device with the exception of the means for applying power to the driver stages.

Although the least significant digit stage is shown to be at the top stage in the illustrated embodiments, this is a matter of choice dictated by convenience and design, particularly for the fluid power device. The most significant digit stage could be just as well at the top and the electric power device offers no obstacles from the standpoint of design.

While there has been shown and described and pointed out the fundamental novel features of this invention as applied to the illustrated embodiments, it will be understood that various omissions and substitutions and changes in the form and details of the device illustrated and in its operation may be made by those skilled in the art without departing from the spirit of the invention. It is the intention, therefore, to be limited only as indicated by the scope of the appended claims and reasonable equivalents thereof.

What is claimed is:

1. A binary-to-analogue converter for angularly positioning an output shaft in relation to a stationary reference member, said converter comprising:

a stationary base plate;

a stationary housing having one end fastened to said base plate and another end with a bearing housing fastened thereto;

a cylindrical support member having one end rigidly fastened to said base plate and another end extending proximately to said bearing housing;

an output shaft substantially aligned with said support member and journaled in said bearing housing;

a flange element integral with the journaled end of said output shaft, said flange element being within said stationary housing and being journaled upon the end of said support member;

a plurality of annular members journaled on said support member and capable of limited angular rotation therearound, the amounts of angular rotations of the annular members being related according to a binary series;

means limiting the amount of angular rotation of any annular member and of the flange element relatively to the preceding annular member and limiting the amount of angular rotation of the first of said members relatively to the stationary base plate, said means comprising a lug operable within an angular zone defined by abutments on the preceding member;

simultaneously operable individual driving means for said annular members comprising:

a cylinder element fastened to the next preceding annular member, the cylinder element relative to the first of said annular members being fastened to the base plate;

a piston member in said cylinder member reciprocable by fluid pressure differentials upon the ends of said piston member;

a toothed rack on a portion of said piston member member intermediate the ends thereof;

and a toothed sector meshing with said rack for tangential driving thereby and adapted to rotate the next following annular member, the last such toothed sector being integral with the flange element of said output shaft;

means transmitting the motion of any of said annular members to the next annular member between it and the flange element of the output shaft;

and means transmitting the motion of the last annular member directly to the flange element of the output shaft to cause said output shaft to be angularly positioned of an amount which is the algebraic sum of the angular motions of the driven annular members.

2. A binary-to-analogue converted for angularly positioning an output shaft in relation to a stationary reference member, said converter comprising:

a stationary base plate;

a stationary housing having one end fastened to said base plate and another end with a bearing housing fastened thereto;

a cylindrical support member having one end rigidly fastened to said base plate and another end extending proximately to said bearing housing;

an output shaft substantially aligned with said support member and journaled in said bearing housing;

a flange element integral with the journaled end of said output shaft, said flange element being within said stationary housing and being journaled upon the end of said support member;

a plurality of annular members journaled on said support member and capable of limited angular rotation therearound, the amounts of angular rotations of the annular members being related according to a binary series;

means limiting the amount of angular rotation of any annular member and of the flange element relatively to the preceding annular member and limiting the amount of angular rotation of the first of said members relatively to the stationary base plate, said means comprising a lug operable within an angular zone defined by abutments on the preceding member;

simultaneously operable individual driving means for said annular members comprising:

an electric motor for each said annular member;

said electric motor having a stator carried by the next preceding annular member and a rotor carried by said annular member;

the stator relative to the first of said annular members being fastened to the stationary base plate;

and the rotor relative to the last of said annular members being fastened to the flange element of the output shaft;

means transmitting the motion of any of said annular members to the next annular member between it and the flange element to the output shaft;

and means transmitting the motion of the last annular member directly to the flange element of the output shaft to cause said output shaft to be angularly positioned of an amount which is the algebraic sum of the angular motions of the driven annular members.

3. An apparatus for converting a binary input signal to an angular shaft rotation, said apparatus comprising:

a stationary base;

a support rod affixed to said base;

an output shaft angularly positionable in relation to said stationary base and substantially aligned with said support rod;

a plurality of annular stages journaled on said support rod;

simultaneously operable driver means on each of said stages for driving the next consecutive stage, said driver means being selectively actuated in response to the binary input signal;

driven means on each stage being driven by the driver means of the next preceding stage;

the driver means for the first stage being affixed to said stationary base and the driven means for the last stage being affixed to said output shaft;

separate means limiting the angular motion of every one of said stages in relation to the preceding one and also limiting the angular motion of the first of said stages in relation to said stationary base, said means comprising a lug operable within an angular zone defined by abutments on the preceding driver support;

the angular motion of said output shaft being the algebraic sum of the individual stage angular rotations representing an analogue equivalent of said binary input signal;

wherein said driver means consists of fluid motors, each of said fluid motors comprising:

a cylinder supported tangentially by each of said stages;

a piston in said cylinder reciprocable by fluid pressure;

and a rod carried by said piston and having a rack meshing with a toothed sector forming the driven means.

4. An apparatus for converting a binary input signal to an angular shaft rotation, said apparatus comprising:

a stationary base;

a support rod affixed to said base;

an output shaft angularly positionable in relation to said stationary base and substantially aligned with said support rod;

a plurality of annular stages journaled on said support rod;

simultaneously operable driver means on each of said stages for driving the next consecutive stage, said driver means being selectively actuated in response to the binary input signal;

driven means on each stage being driven by the driver means of the next preceding stage;

the driver means for the first stage being affixed to said stationary base and the driven means for the last stage being affixed to said output shaft;

separate means limiting the angular motion of every one of said stages in relation to the preceding one and also limiting the angular motion of the first of said stages in relation to said stationary base said means comprising a lug operable within an angular zone defined by abutments on the preceding driver support;

wherein each said stage forms an electric motor with its corresponding preceding stage;

the driver means consists of the stator of said motor; and the driven means consist of the rotor of said motor.

References Cited in the file of this patent

UNITED STATES PATENTS

| | | |
|---|---|---|
| 1,928,874 | Baumann | Oct. 3, 1933 |
| 2,077,962 | Smith | Apr. 20, 1937 |
| 2,197,867 | Klement | Apr. 23, 1940 |
| 2,852,764 | Frothingham | Sept. 16, 1958 |
| 2,911,956 | Smith | Nov. 10, 1959 |
| 2,916,205 | Litz | Dec. 8, 1959 |
| 2,969,042 | Litz et al. | Jan. 24, 1961 |

FOREIGN PATENTS

| | | |
|---|---|---|
| 682,998 | Great Britain | July 11, 1951 |